United States Patent

Paine et al.

[15] 3,636,711
[45] Jan. 25, 1972

[54] SOLID PROPELLANT ROCKET MOTOR

[72] Inventors: T. O. Paine, Deputy Administrator of the National Aeronautics and Space Administration with respect to an invention of; Floyd A. Anderson, Pasadena, Calif.

[22] Filed: July 16, 1968

[21] Appl. No.: 745,337

[52] U.S. Cl. ............................................................. 60/254
[51] Int. Cl. ........................................................ F02k 9/04
[58] Field of Search ........................... 60/232, 234, 254

[56] References Cited

UNITED STATES PATENTS

| | | |
|---|---|---|
| 3,052,091 | 9/1962 | D'Ooge .................................. 60/254 |
| 3,177,655 | 4/1965 | White ..................................... 60/254 |
| 3,293,855 | 12/1966 | Cuttill ..................................... 60/229 |
| 3,302,890 | 2/1967 | Silver ..................................... 60/253 |
| 3,367,112 | 2/1968 | Mainhardt .............................. 60/201 |

Primary Examiner—Samuel Feinberg
Attorney—J. H. Warden, M. F. Mott and G. T. McCoy

[57] ABSTRACT

A solid propellant rocket motor is provided with a venting system, which is used to control the motor's effective nozzle throat area. By controlling the nozzle throat area the ratio of the motor's ratio of free chamber volume to nozzle throat area is controlled, thereby controlling the motor's combustion extinction pressure, the value of which determines whether the motor is in a stable or unstable combustion zone.

2 Claims, 4 Drawing Figures

PATENTED JAN 25 1972          3,636,711

FLOYD A. ANDERSON
INVENTOR.

BY
ATTORNEYS

SOLID PROPELLANT ROCKET MOTOR

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

This invention generally relates to a rocket motor and, more particularly, to a solid propellant rocket motor with stop and restart capabilities.

2. Description of the Prior Art

The advantages of rocket motors, using solid propellants, are well known by those familiar with the design of rocket motors and their related fueling problems. One major advantage of solid propellants is in the relative simplicity of the motor in which the propellant is mounted. When designing such a motor for space applications, added advantages can be gained if the motor is designed to operate at a relatively low chamber pressure. Relatively low chamber pressure is intended to refer to a pressure of 100 p.s.i.a. and below.

A low chamber pressure permits the use of a lightened pressure vessel, thereby improving the mass fraction of the propellant in a given motor size. A lower chamber pressure also results in less erosion in the throat. A lightened nozzle can then be used, permitting a greater selection of nozzle materials. Also, momentum losses due to the solid particles in the gas stream of an aluminized propellant system appear to be smaller at the lower operating pressures due to the smaller particle size of the solids at the lower pressures.

However, the aforementioned advantages are real only if the lower pressure does not result in unacceptable performance losses. When operating any of the known solid propellant rocket motors at low pressures, problems have been experienced in igniting the propellant and in sustaining the normal burning of the propellant until it was exhausted. Added difficulties have been experienced when attempts were made to stop and restart the motor. Thus, a need exists for an improved solid propellant rocket motor which can be reliably stopped and restarted at low pressure.

OBJECTS AND SUMMARY OF THE INVENTION

It is a primary object of this invention to provide a new improved solid propellant rocket motor.

Another object of this invention is to provide a new improved solid propellant rocket motor which operates reliably at low chamber pressures.

A further object of this invention is the provision of a solid propellant rocket motor with stop and restart capabilities at low chamber pressures.

These and other objects of the invention are achieved by providing a solid propellant rocket motor which includes an arrangement, by means of which chamber conditions may be changed to shift the motor between stable and unstable regions of combustion. The design of the novel solid propellant rocket motor of the present invention is based on the findings that a solid propellant, within a rocket motor, has a lower pressure limit of combustion, i.e., combustion extinction pressure which is directly related to, and correlates with, the ratio of free chamber volume to nozzle throat area, of the particular motor chamber. This is defined as free chamber volume throat area and will hereafter be designated as $L^*$.

At the boundary between stable and unstable combustion zones $L^* = K P_c^{-2n}$, where $K$ is a constant for the particular propellant, $P_c$ is chamber pressure and $n$ is burning rate pressure exponent. The combustion extinction pressure has been found to be independent of the propellant grain geometry and also independent of the atmospheric back pressure.

Thus, for any given propellant it is possible to switch the motor from a stable to an unstable combustion zone and vice versa by varying $L^*$, i.e., shifting the chamber condition. The shift of chamber condition is accomplished by providing the motor with a controlled venting system. $L^*$ is made to equal the ratio of the free chamber volume versus the throat area plus the area of vents. By opening or closing the vents, $L^*$ is varied.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
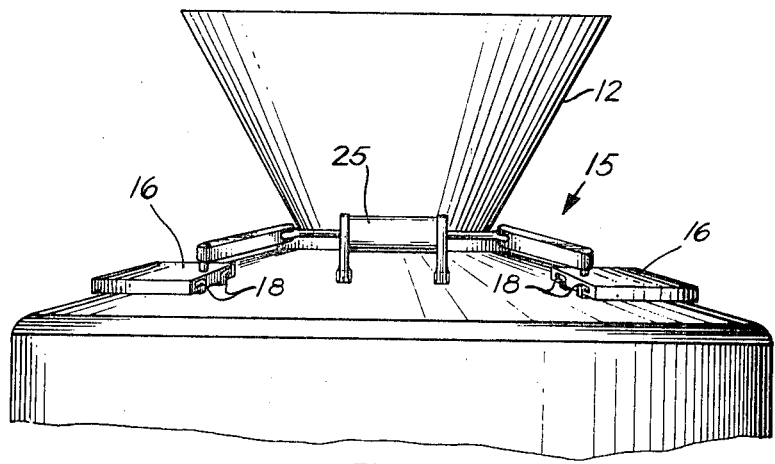
FIGS. 1 and 2 are side and top cross-sectional views respectively of a solid propellant rocket motor incorporating the present invention.
Figure 2:
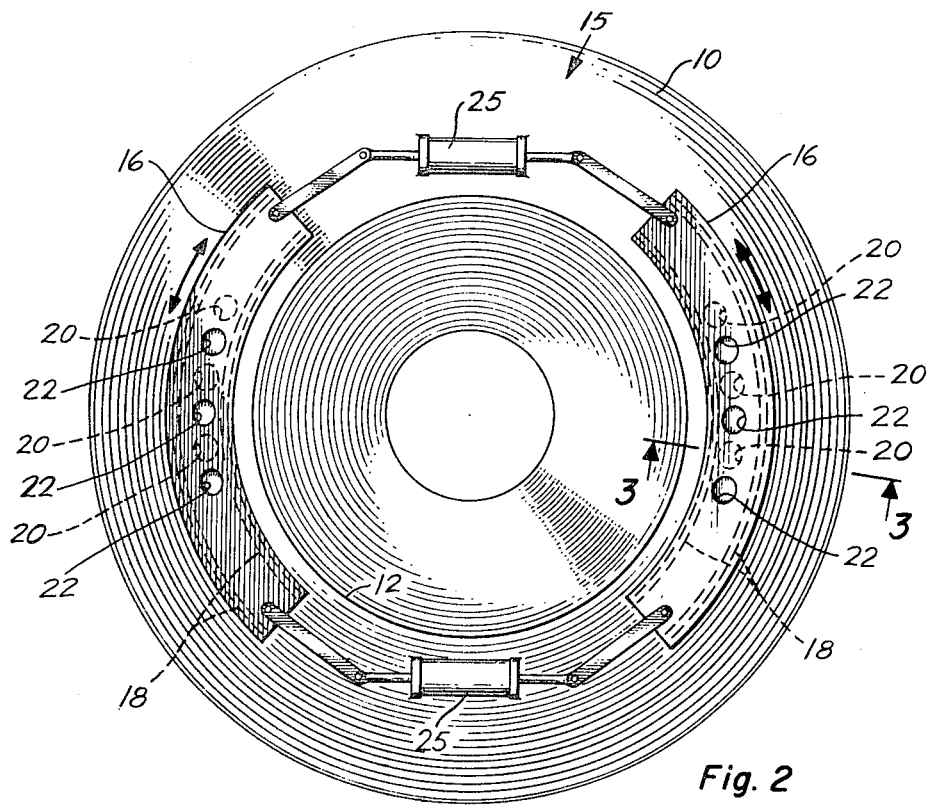

Reference is now made to FIGS. 1 and 2 which are side and top views, respectively, of a solid propellant rocket motor which incorporates the present invention. In these figures the motor is shown, consisting of chamber 10, with a conventional type nozzle 12 which is centrally disposed at one end of the chamber. A venting system 15 is provided about the nozzle 12.

Figures 3, 4:
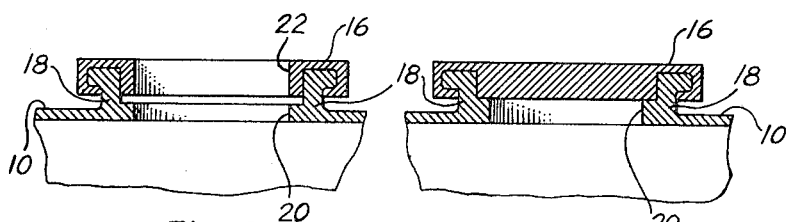
FIG. 3 is a cross-sectional view along lines 3—3 of FIG. 2.
FIG. 4 is a partial cross-sectional view useful in explaining the invention.

The venting system comprises a plurality of partial ring members 16, which are disposed radially outwardly from the throat area of nozzle 12. Members 16 are slidably mounted on flange members which are designated by numerals 18, in FIG. 3. FIG. 3 is a cross-sectional view along lines 3—3 in FIG. 1.

The flanges 18 are circumferentially disposed about the nozzle 12 so that the ring members 16 slide circumferentially about the nozzle. The ring members 16 are formed to conform to the end wall of chamber 10. They are sufficiently wide to cover a plurality of vents or ports 20, which are disposed in the end wall of the chamber and which extend from the interior to the exterior thereof, to enable combustion gases to escape therefrom to the atmosphere when any of them is aligned with a matching port 22, disposed in one of the ring members. FIG. 4 represents a cross-sectional view in which a matching port 22 is aligned with a chamber port 20. Such an open port 20, in essence, increases the overall throat area with respect to the free chamber volume, thus changing $l^*$.

From the foregoing it should thus be apparent that the ratio of free chamber volume to throat area is changed by increasing the effective throat area, which is accomplished by sliding ring members 16, which act as cover plates, so that their ports 22 are aligned with chamber port 20. The sliding of the ring members 16 may be achieved by one or more actuators 25. The latter may slide each ring member separately or simultaneously in order to produce any desired throat area change. Any known means, such as servo units may be employed in the implementation of actuators 25.

It has been found that by varying the effective throat area with the venting system of the present invention, rather than by attempting to vary the actual throat area of the nozzle, many mechanical problems are minimized. This is particularly due to the fact that the venting system is only subjected to the added combustion gases which may escape therethrough rather than be subjected to the main stream of combustion gases which escape through the nozzle.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. In a solid propellant rocket motor of the type including a combustion chamber and a propulsion nozzle at one end thereof, the improvement comprising:

said chamber defining a plurality of apertures circumferentially disposed about the center of said nozzle, each aperture extending from the interior to the exterior of said chamber; and means for controlling the communication between the interior and exterior of said chamber through said venting apertures, said means for controlling including a plurality of cover plates slidably mounted about the circumference of said nozzle adjacent said apertures and means for sliding said cover plates circumferentially about said nozzle to control the portions of said apertures which are exposed to the exterior of said chamber.

2. The solid propellant rocket motor, as recited in claim 1, wherein each cover plate defines apertures, whereby the portions of the apertures in said chamber which are exposed to the exterior of said chamber is a function of the relative positions of the apertures in the cover plates with respect to the chamber's apertures.

* * * * *